(12) United States Patent
Chadwell, IV (10) Patent No.: US 9,840,184 B2
(45) Date of Patent: Dec. 12, 2017

(54) STRAP RETAINING APPARATUS (71) Applicant: Charles Herbert Chadwell, IV, Round Rock, TX (US)

(72) Inventor: Charles Herbert Chadwell, IV, Round Rock, TX (US)

( * ) Notice: Subject to any disclaimer, the term of this patent is extended or adjusted under 35 U.S.C. 154(b) by 0 days.

(21) Appl. No.: 15/098,188

(22) Filed: Apr. 13, 2016

(65) Prior Publication Data

US 2016/0297348 A1  Oct. 13, 2016

Related U.S. Application Data

(60) Provisional application No. 62/146,544, filed on Apr. 13, 2015.

(51) Int. Cl.
*B60P 7/08* (2006.01)
*F16B 2/22* (2006.01)

(52) U.S. Cl.
CPC ............. *B60P 7/0869* (2013.01); *F16B 2/22* (2013.01)

(58) Field of Classification Search
CPC ........ B60P 7/0869; B60P 7/0823; F16B 2/22; F16B 2/20; E04H 9/14
USPC .......................................................... 52/84
See application file for complete search history.

(56) References Cited

U.S. PATENT DOCUMENTS

| | | | | |
|---|---|---|---|---|
| 2,728,100 A | * | 12/1955 | Oishei | B60S 1/3801 15/250.44 |
| 2,954,208 A | * | 9/1960 | Ewald | F01D 5/18 29/889.72 |
| D241,116 S | * | 8/1976 | Berry | D8/384 |
| 4,388,888 A | * | 6/1983 | Gushurst, Jr. | B63H 9/0607 114/102.32 |
| 4,464,808 A | * | 8/1984 | Berry | B60S 1/0408 15/250.201 |
| 4,624,425 A | * | 11/1986 | Austin | B64C 1/061 244/118.1 |
| 4,782,547 A | * | 11/1988 | Mohnach | B60S 1/522 15/250.04 |
| D308,845 S | * | 6/1990 | Charet | D12/220 |
| 5,050,924 A | * | 9/1991 | Hansen | B60P 7/0876 296/100.15 |
| 5,206,969 A | * | 5/1993 | Patterson | B60S 1/3806 15/250.001 |
| 5,371,903 A | * | 12/1994 | Lew | A41D 13/00 2/1 |
| 5,448,805 A | * | 9/1995 | Allen | B60P 7/0869 224/318 |
| 5,518,348 A | * | 5/1996 | Tucker | B60P 7/0869 410/41 |
| 5,636,776 A | * | 6/1997 | Rak | B60R 9/045 224/309 |
| 5,697,663 A | * | 12/1997 | Chenowth | B60P 7/04 296/98 |
| 5,823,604 A | * | 10/1998 | Chenowth | B60P 7/04 296/98 |
| 5,882,062 A | * | 3/1999 | Chenowth | B60J 7/068 296/100.11 |
| 5,943,963 A | * | 8/1999 | Beals | B61D 45/001 105/355 |

(Continued)

*Primary Examiner* — Brent W Herring
(74) *Attorney, Agent, or Firm* — Hulsey P.C.

(57) ABSTRACT

The disclosure provides an air deflection apparatus for deflecting airflow around a segment of a strap when the strap is tensioned for securing a load on a movable transport.

14 Claims, 10 Drawing Sheets

(56) References Cited

U.S. PATENT DOCUMENTS

| | | | | |
|---|---|---|---|---|
| 5,988,978 | A * | 11/1999 | Pearce | F04D 29/662 416/145 |
| 6,183,201 | B1 * | 2/2001 | Maby | F04D 25/088 416/170 R |
| 7,036,771 | B1 * | 5/2006 | Pouchkarev | B63B 35/7979 244/152 |
| 7,258,516 | B1 * | 8/2007 | Collins | B60P 7/0807 410/99 |
| 7,354,096 | B2 * | 4/2008 | Hacker | B60J 11/00 296/136.12 |
| 7,451,579 | B2 * | 11/2008 | Azarin | E04C 5/203 248/74.3 |
| 7,802,341 | B2 * | 9/2010 | Cempura | B60S 1/381 15/250.201 |
| 7,861,363 | B2 * | 1/2011 | Moll | B60S 1/38 15/250.201 |
| 8,024,836 | B2 * | 9/2011 | Moll | B60S 1/38 15/250.201 |
| 8,215,181 | B1 * | 7/2012 | Helmink | G01M 5/0016 73/760 |
| 8,256,715 | B2 * | 9/2012 | Ballard | B64C 39/024 244/123.1 |
| 8,322,988 | B1 * | 12/2012 | Downs | F01D 5/147 416/96 A |
| 8,336,158 | B2 * | 12/2012 | Stankiewicz | B60S 1/381 15/250.201 |
| 8,857,009 | B2 * | 10/2014 | Thielen | B60S 1/3889 15/250.201 |
| 8,919,070 | B2 * | 12/2014 | Moses | E04F 13/0805 403/391 |
| 9,321,392 | B1 * | 4/2016 | LeBrun | B60P 7/0869 |
| 2004/0086386 | A1 * | 5/2004 | Steinheiser | F04D 29/703 416/62 |
| 2007/0128034 | A1 * | 6/2007 | Lee | F01D 5/187 416/97 R |
| 2007/0174989 | A1 * | 8/2007 | Moll | B60S 1/38 15/250.201 |
| 2007/0186966 | A1 * | 8/2007 | Hacker | B60J 11/00 135/88.05 |
| 2008/0025846 | A1 * | 1/2008 | Vance | F01D 5/147 416/233 |
| 2009/0113655 | A1 * | 5/2009 | Lucker | B60S 1/3806 15/250.201 |
| 2010/0037417 | A1 * | 2/2010 | Moll | B60S 1/38 15/250.201 |
| 2010/0123042 | A1 * | 5/2010 | Ballard | B64C 39/024 244/118.1 |
| 2010/0150707 | A1 * | 6/2010 | Jevons | F01D 5/147 415/200 |
| 2010/0218332 | A1 * | 9/2010 | Stankiewicz | B60S 1/381 15/250.201 |
| 2010/0277379 | A1 * | 11/2010 | Lindackers | H01Q 1/1207 343/713 |
| 2012/0124767 | A1 * | 5/2012 | Thielen | B60S 1/3889 15/250.361 |
| 2012/0177868 | A1 * | 7/2012 | Horgash | G09F 15/0031 428/100 |
| 2013/0185891 | A1 * | 7/2013 | Nacamuli | B60S 1/386 15/250.201 |
| 2014/0101884 | A1 * | 4/2014 | Balitzkat | B60S 1/381 15/250.201 |
| 2016/0104932 | A1 * | 4/2016 | Aminzadeh | H01Q 1/3275 343/872 |

\* cited by examiner

STRAP RETAINING APPARATUS

CROSS-REFERENCE TO RELATED APPLICATIONS

This application claims priority to Provisional Patent Application No. 62/146,544, filed Apr. 13, 2015, which is hereby incorporated by reference in its entirety.

FIELD OF THE INVENTION

The present disclosure relates to a strap retaining apparatus. More specifically, the present disclosure relates to an apparatus that restrains straps and tie-downs on large trucks and keeps them from flapping in the wind.

BACKGROUND OF THE INVENTION

The disclosed subject matter provides a strap retaining apparatus, more specifically a system that restrains straps and tie-downs on large trucks from flapping in the wind.

The transportation industry today is largely reliant upon the transportation of goods via pickups, flatbed trucks, flatbed trailers, car haulers, pipe-hauling trailers, flatbed train cars, or any transport vehicle with its load open to the wind during operation. Some goods can be packaged or stored in a way that allows for safe and successful transportation. Other goods, however, must be secured during transportation. Apparatus and methods have been developed to secure cargo in place while in transit.

These devices may have a number of different configurations. For example, they may include a short length of strap that hooks to an anchor member on a trailer or other structure and a longer strap that passes through or around a shaft turned by a ratcheting handle or lever to tighten the longer strap. The length of the strap required to secure the cargo often depends on the dimensions of the cargo itself or the means of transporting the cargo. As such, it is not uncommon for there to be "extra" length of a portion of the strap. This "extra" portion of the strap is undesirable. Indeed, portions of the strap are prone to flap in the wind, whether in tension or not. Therefore, a strap retaining apparatus solving the aforementioned problems is desired.

BRIEF SUMMARY OF THE INVENTION

The disclosed subject matter provides an apparatus configured to receive a portion of a securing strap for securing a load with the strap installed and under tension. In some embodiments, the apparatus comprises a clip portion configured for engagement with the strap and an airfoil portion supported by the clip portion. The clip portion may include an interior surface, an exterior surface, or both.

The interior surface of the clip portion may include at least one protrusion. In some embodiments, the clip portion may comprise a first interior space adjacent the interior side. In embodiments, the airfoil portion may encompass the clip portion, or a portion of the clip portion. In embodiments, the airfoil portion may include an open end and at least one second interior space. The at least one second interior space may be confined between the clip portion and the airfoil portion.

BRIEF DESCRIPTION OF THE DRAWINGS

The novel features believed characteristic of the disclosed subject matter will be set forth in any claims that are filed later. The disclosed subject matter itself, however, as well as further objectives and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by such terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
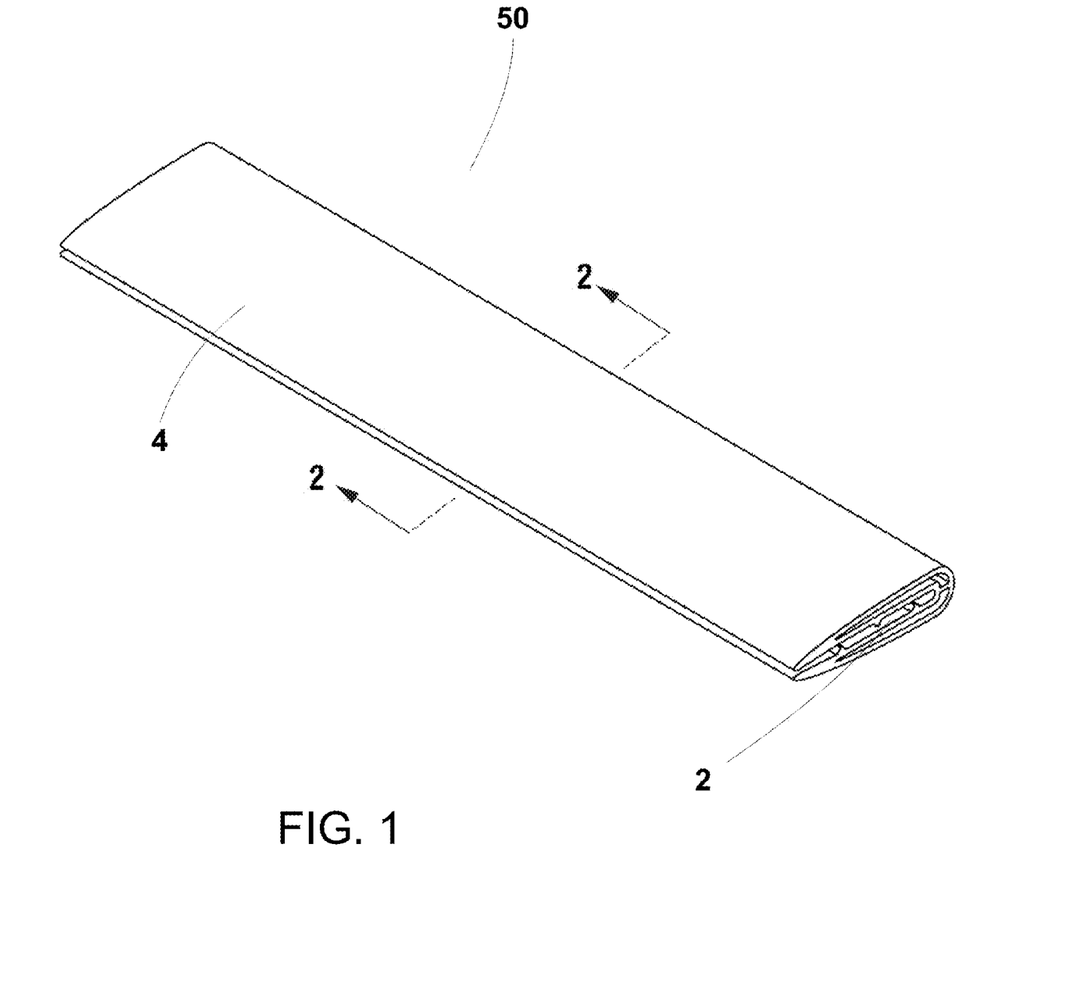
FIG. 1 displays a perspective view of a strap retaining apparatus in accordance with embodiments.

FIG. 1 displays a strap retaining apparatus 50 in accordance with embodiments. The apparatus 50 may be configured to receive a portion of a securing strap for securing a load with the strap installed and under tension. The apparatus may comprise a clip portion 2 configured for engagement with the strap and an airfoil portion 4 supported by the clip portion 2.

Figure 2:
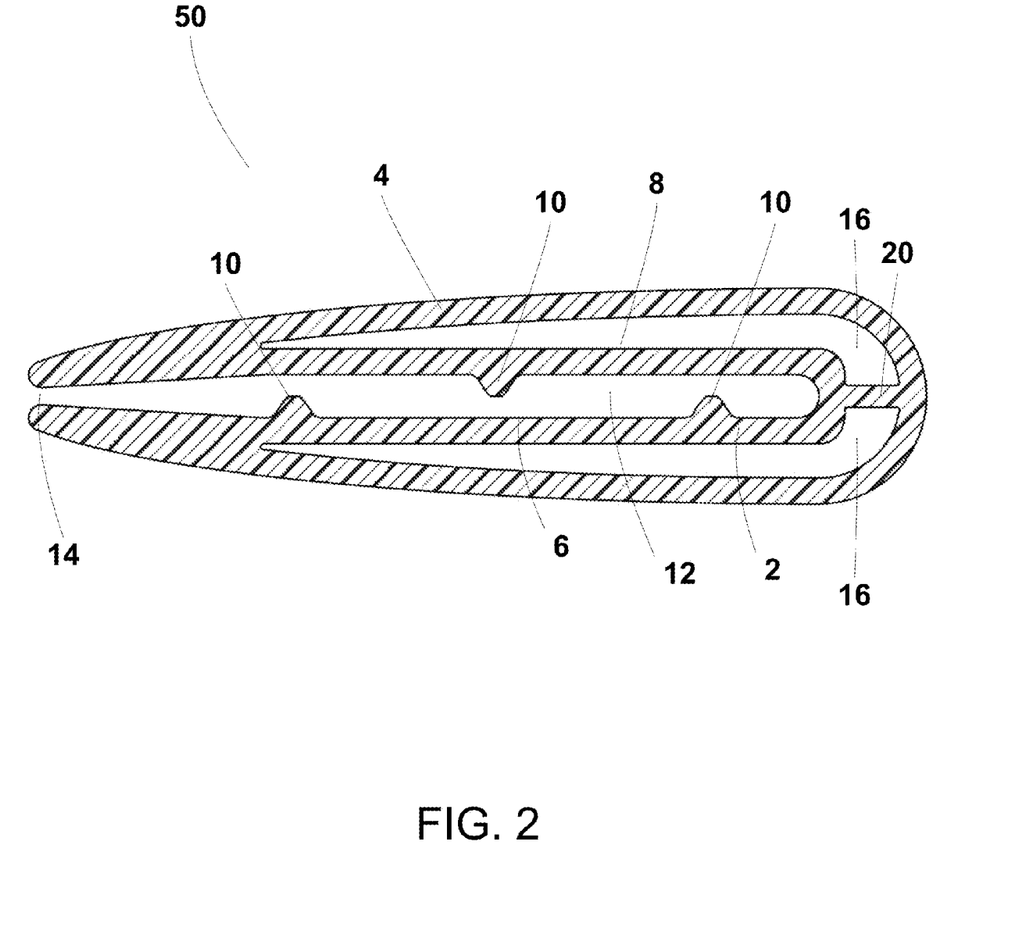
FIG. 2 displays a cross-sectional view of a strap retaining apparatus in accordance with embodiments.

FIG. 2 displays a cross-sectional view of a strap retaining apparatus 50 in accordance with embodiments. The clip portion 2 may comprise at least one of an interior surface 6 and an exterior surface 8. In embodiments, the interior surface 6 may comprise at least one protrusion 10. FIG. 2 displays three instances of protrusion 10. Alternative embodiments may include additional or fewer instances of protrusion 10. For perspective, FIG. 2 is a cross-sectional view of the subject matter of FIG. 1.

The clip portion 2 may comprise a first interior space 12 for receiving and retaining a strap, adjacent the interior surface 6. The first interior space 12 may be sufficient to provide enough space for at least a portion of a strap. In embodiments, the airfoil portion 4 may encompass the clip portion 2. In embodiments, the airfoil portion 4 may encompass at least a portion of the clip portion 2.

In embodiments, the airfoil portion 4 may comprise an open end 14. The open end 14 may allow sufficient space for at least a portion of a strap to slide through the open end 14.

In embodiments, the airfoil portion 4 may comprise at least one second interior space 16. The at least one second interior space 16 may allow the apparatus to be lighter since air may take up the space where a portion of the apparatus may normally exist. The at least one second interior space 16 may exist adjacent to the exterior surface of the clip 8 and the airfoil portion 4.

In some embodiments, the strap retaining apparatus 50 may include more than one first interior space 12 and clip portion 2. Such embodiments may allow the strap retaining apparatus 50 to receive at least a portion of more than one strap.

Figure 3:
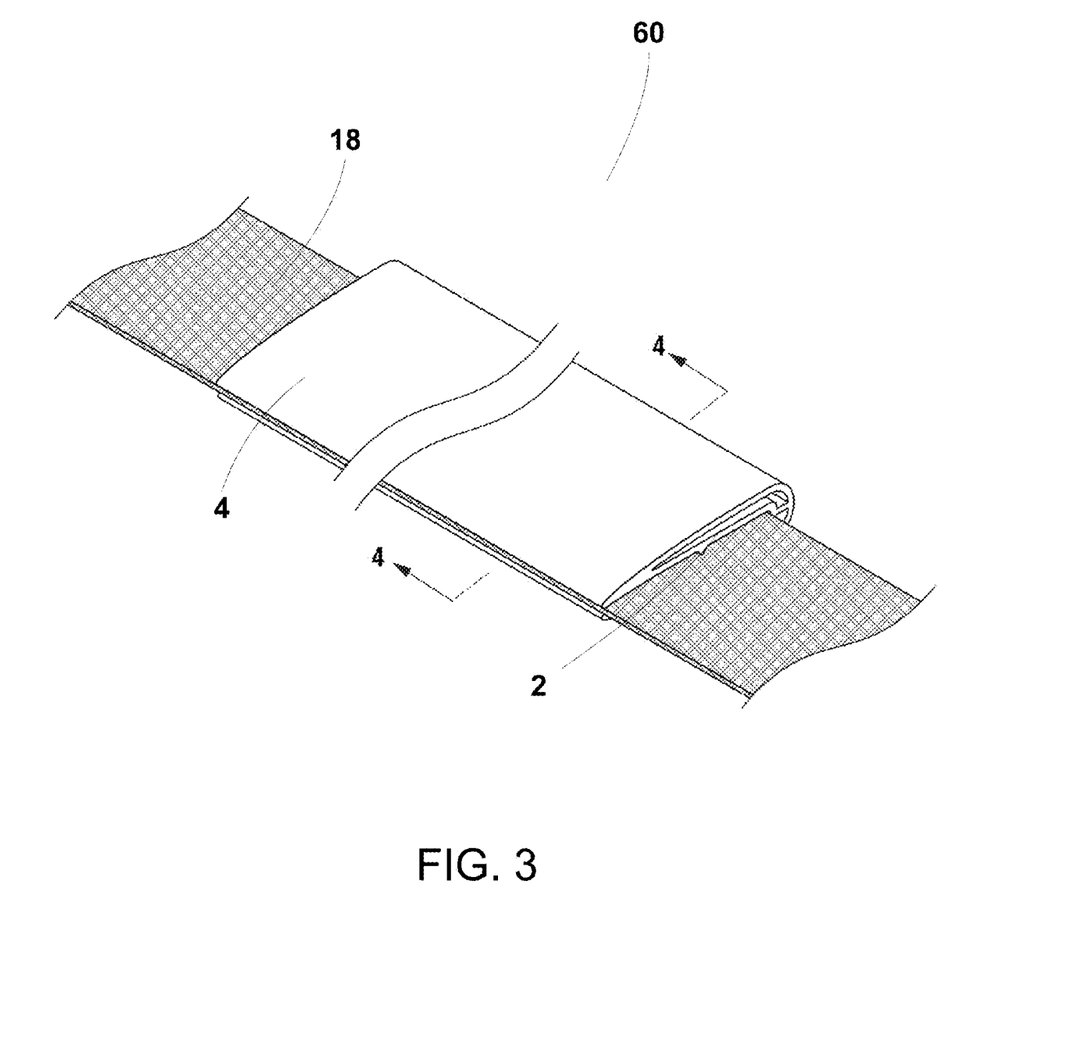
FIG. 3 displays a strap retaining system in accordance with embodiments.
Figure 4:
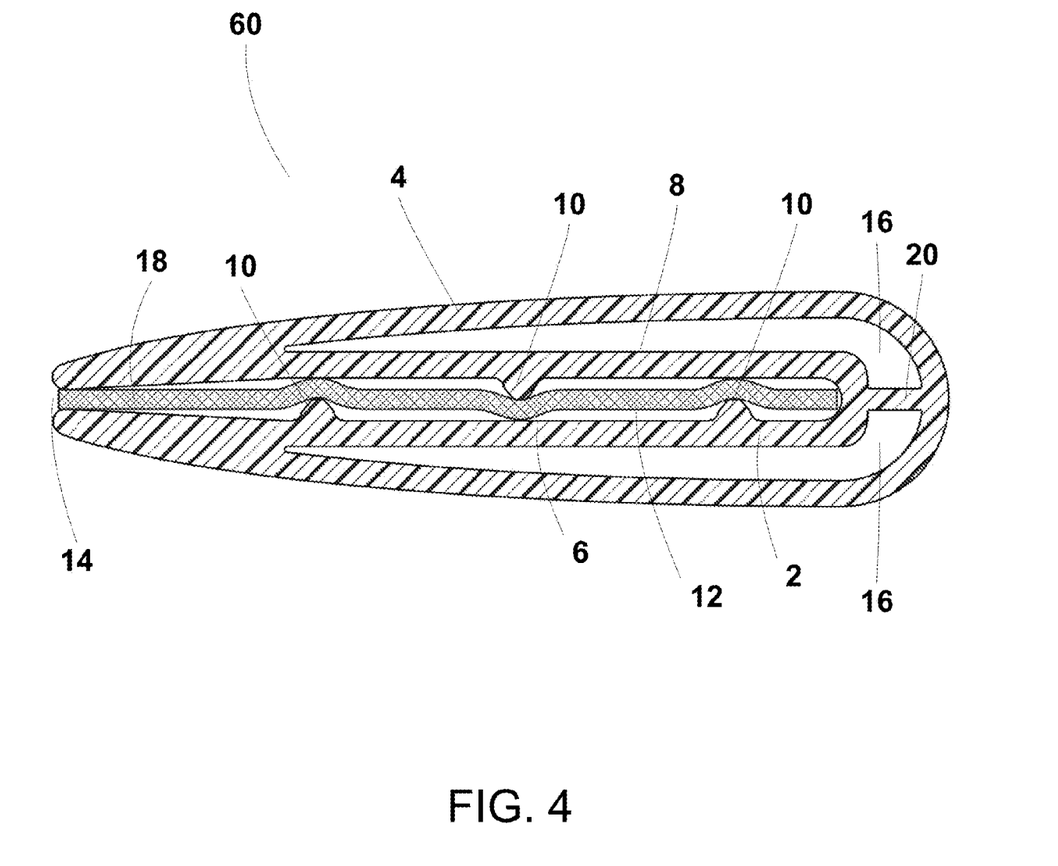
FIG. 4 displays a cross-sectional view of a strap retaining system in accordance with embodiments.

FIG. 3 displays a strap retaining system 60 in accordance with embodiments. FIG. 4 displays a cross-sectional view of a strap retaining system 60 in accordance with embodiments. The system 60 may include a clip portion 2. The clip portion 2 may include an interior surface 6 and an exterior surface 8. The interior surface 6 may comprise at least one protrusion 10.

The illustrative embodiment shown in FIGS. 3 and 4 depict a securing strap 18 configured to fit within the first interior space 12. In FIG. 4, the securing strap 18 is retained within the first interior space 12. The protrusions 10 may provide extra contact and surface area to the strap 18 so that more friction may be applied to the strap 18. In embodiments, the protrusions 10 may also impede the egress of the strap from the first interior space by other mechanical interactions. The clip portion 2 may further comprise a first interior space 12 adjacent the interior surface 6. For perspective, FIG. 4 is a view of FIG. 3 as a cross-sectional view. It is noted that the protrusions 10 may collectively apply a force to a securing strap 18 in which case they may act as a clamp or portion of a clamp for a securing strap 18. In embodiments, the protrusions 10 may contact the securing strap 18 at various angles. For example, one or more protrusions 10 may exist on the clip portion 2. One or more protrusions 10 may exist on a first surface of the interior portion of the clip portion 2 and one or more protrusions 10 may exist on a second surface of the interior portion of the clip portion 2 that may face at least a portion of the first surface. In embodiments, the protrusions 10 may be of the same material as the clip portion 2 and may collectively act as a single piece. In embodiments, one or more protrusions 10 may exist on one of the first or second surfaces of the interior portion of the clip portion 2. In embodiments, the protrusions 10 may be longitudinally spaced along the length of the first and/or second surfaces of the clip portion 2.

The system 60 may further comprise an airfoil portion 4 comprising an elongate body, wherein the elongate body encompasses the clip portion 2. The airfoil portion may engage at least a portion of the clip portion 2. The airfoil portion 4 may further comprise an open end 14 that may extend the length of the airfoil portion 4.

At least one second interior space 16 may exist adjacent to the exterior surface 8 and the airfoil portion 4. This may allow for an overall lighter system 60 due to the fact that air may exist where a portion of the system 60 would normally exist.

In embodiments, the system 60, and more specifically, the interior surface 6, may comprise three protrusions 10. The protrusions may apply a force on a strap 18 and provide friction in order to keep the strap 18 from moving. It should be recognized that, while the presently disclosed embodiment includes three instances of protrusion 10, alternative embodiments may include additional or fewer instances of protrusion 10.

In embodiments, the protrusions 10 may comprise a slant of 45 degrees. The slant may allow for sufficient contact with a strap 18. In embodiments, the protrusions may comprise a slant at an angle other than 45 degrees.

In embodiments, the apparatus 50 and/or system 60 may comprise two second interior spaces 16 (as seen in FIG. 2 and FIG. 4). The spaces 16 may take up a portion of the area between the clip portion 2 and the airfoil portion 4 in order to provide a lighter apparatus 50 and/or system 60 as well as provide more flexibility. The two second interior spaces 16 may be separated by a small connecting wall 20 that may run a length from the exterior surface of the clip portion 8 to the airfoil portion 4. The connecting wall 20 may provide the apparatus 50 or system 60 additional rigidity.

In embodiments, the apparatus 50 may envelop the entire width of a strap 18 when in use.

In embodiments, the length of the apparatus 50 and/or the system 60 may be less than a foot. In embodiments, the length of the apparatus 50 and/or the system 60 may be greater than a foot.

In embodiments, the apparatus 50 may comprise a spring loaded gate that may automatically open and close when an object is slid into the first interior space 12. Grooves may exist within the airfoil portion 4. One groove may exist on one side adjacent the open end 14 and the other groove may exist on the opposite side adjacent the open end 14 (in the closed position, the gate may obstruct the open end 14).

The gate may comprise a lengthwise orifice in which a pin may rest. The pin may run a portion of the length of the airfoil portion 4 within the wall. To keep the gate from falling out of the apparatus 50, the ends of the pin may be fixed or may exist within orifices adjacent the groove where a portion of the gate and the pin exist. The pin may allow the gate to "hinge" so that the gate may make the first interior space 12 accessible and inaccessible. One or more loaded springs may be fixed to the pin and/or a portion of the airfoil portion 4 within one of the grooves. In embodiments, the one or more springs may comprise an anchor embedded within the gate. The anchor may be an object located in an orifice within the gate. The orifice may be closed off or may comprise an opening smaller than the thickness of the object. In other embodiments, the one or more springs may be wrapped around a portion of the pin.

In embodiments, the one or more springs may run the width of the gate and may be affixed to a portion of the gate opposite the portion where the one or more springs are affixed within one of the grooves. To avoid the one or more springs disrupting or disabling operation of the gate, orifices may exist within the gate so that the one or more springs may exist within the gate. The one or more springs may be affixed in a manner similar to previously described affixing means. In embodiments, the gate may run substantially the length of the airfoil portion 4. In this embodiment, the pin may run through the remaining length of the airfoil portion 4 to the exterior of the airfoil portion 4. The ends of the pin on the exterior of the airfoil portion 4 may comprise a larger thickness than the pin found in the interior of the airfoil portion 4.

In embodiments, the clip portion 2 may exist external to the airfoil portion 4. The clip portion 2 may be affixed to the edge of the airfoil portion 4 (where the open end 14 exists in certain embodiments). The clip portion 2 may slide on a strap 18 the same way as described in the methods previously disclosed. The airfoil portion 4 may act as a stabilizing rudder that may give rigidity to the strap 18. In embodiments, the clip portion 2 may comprise a hinge portion that may allow the clip portion 2 to apply additional pressure to the strap 18. In embodiments, the clip portion 2 may consist of one or more spring hinges attached to the airfoil portion 4.

In embodiments, the end of the clip portion 2 and airfoil portion 4 opposite the open end 14 of the airfoil portion 2 may act as a piano hinge. The knuckle of the hinge may exist opposite the open end 14. The apparatus 50 may be essentially cut in half length-wise so that each half may act as the leaves of the hinge. When in a clamped position, one half may comprise at least one male member and the other half may comprise at least one female member in order to properly secure the two halves. In embodiments, aforementioned apparatus 50 may comprise one or more loaded spring setups, such as the setups described previously.

In embodiments, at least one spring hinge may take the place of a clip portion 2 as generally described. Two leaf portions of the spring hinge may extend from a knuckle portion (including a spring) and may affix to a portion of the clip portion 2 near the open end 14 of the clip portion 2. Spring extensions protruding from the end of the spring may apply a force on an exterior surface of the leaf portions in order to keep the spring hinge in a closed configuration. In embodiments, the closed end of the clip portion 2 may additionally include a knuckle of a hinge in order for the clip portion 2 to bend with the spring hinge.

In embodiments, system 60 may incorporate apparatus 50.

Figure 5:
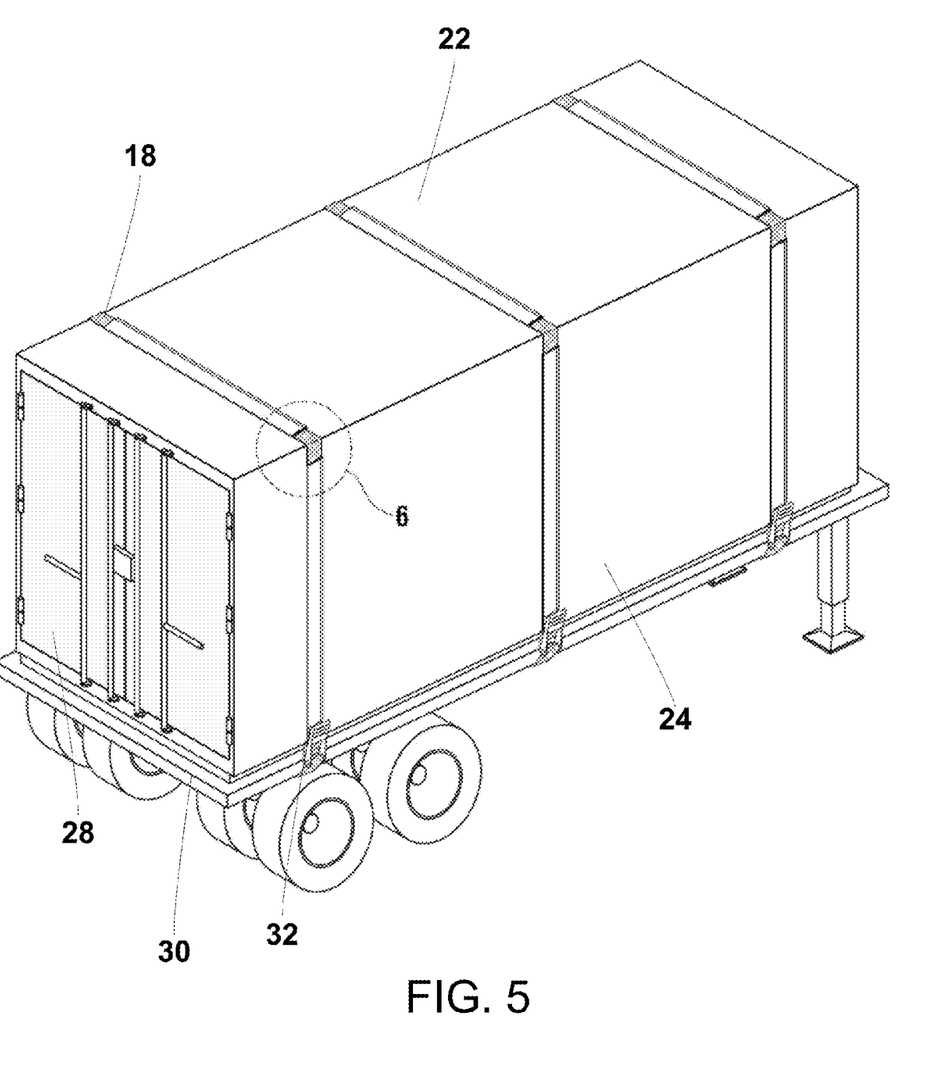
FIG. 5 displays an exemplary in situ embodiment of several strap retaining apparatus, each installed on a strap.

FIG. 5 displays an exemplary use of a strap retaining system 60 in accordance with embodiments. In embodiments, the system 60 may include a clip portion 2. The clip portion 2 may include interior and exterior surfaces, as well as at least one protrusion, as described above with respect to FIG. 3 and FIG. 4. The system 60 may further include a clip portion 2 with a securing strap configured to fit within a first interior space 12. The system 60 may further include protrusions 10 that provide extra contact and surface area to a strap 18 so that more friction may be applied to said strap 18 as described above.

The system in the illustrated embodiment of FIG. 5 includes six strap retaining systems 60, and more specifically clip portions 2, that have been slid over a portion of a securing strap 18. The securing strap 18 can be used, for example, to secure a load 28 by securing the strap retaining system 60 over the top of the load 22 and across the sides of the load 24. When in use, the non-open side of the apparatus 50 may face the front end of the truck to which the securing straps 18 are attached.

Figure 6:
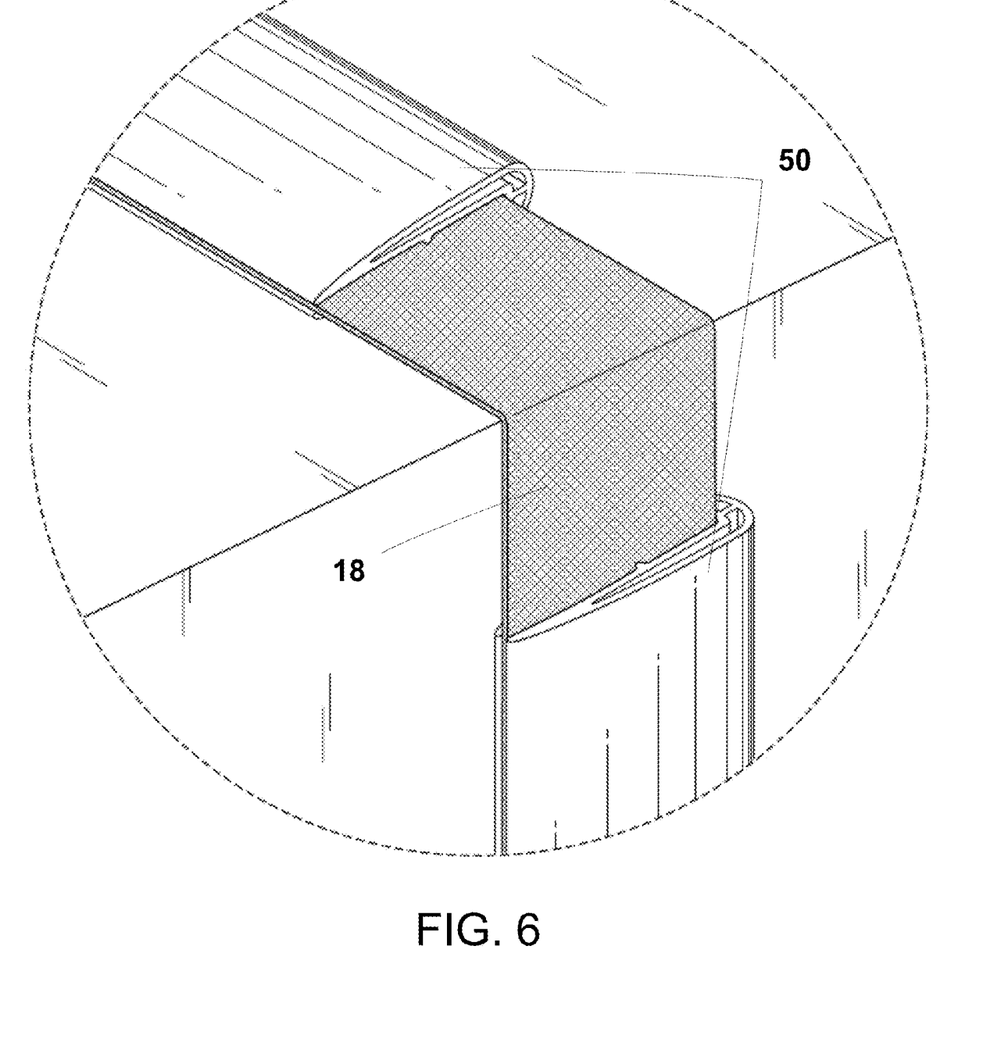
FIG. 6 displays a magnified view of one of a strap retaining apparatus embodiments as seen in FIG. 5.

FIG. 6 displays a magnified view of two of a strap retaining apparatus 50 embodiments as seen in FIG. 5. The securing strap 18 is fixed to the trailer 30 at fixation point 32. In some embodiments there may be more than one fixation point 32 on the trailer 30 such that multiple securing straps 18, and thus multiple strap retaining systems 60/apparatuses 50, may be fixed to the trailer 30. As a result, some embodiments may include multiple strap retaining systems 60 in use on a single trailer 30.

Figure 7:
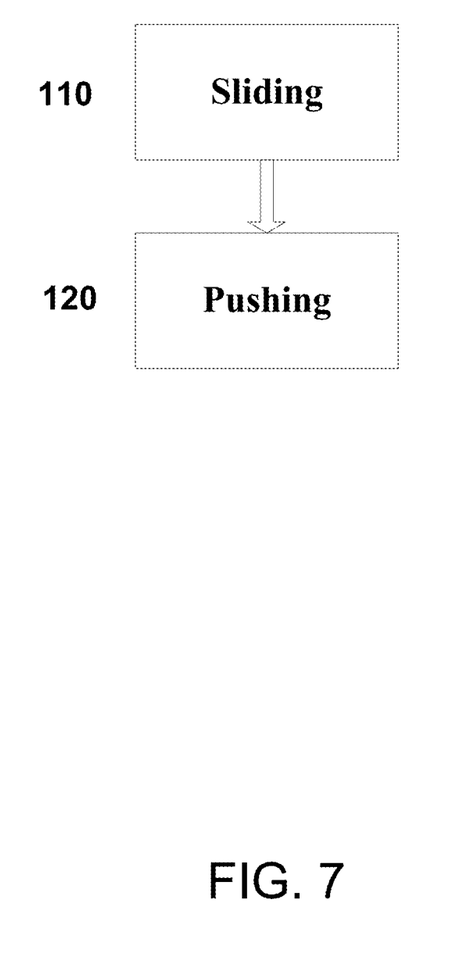
FIG. 7 displays a method for retaining a securing strap in accordance with embodiments.

FIG. 7 displays a method 100 for retaining a securing strap 18 in accordance with embodiments. The method 100 may comprise sliding 110 a clip portion 2 over a portion of a securing strap 18. The clip portion 2 may comprise an interior surface 6 and an exterior surface 8. The interior surface 6 may come in contact with the strap 18 and may further include one or more protrusions 10 that may also contact the strap 18. The clip portion 2 may further comprise a first interior space 12 adjacent the interior surface 6 where the strap 18 may settle.

In order to seamlessly slide the clip portion 2 over the strap 18, the entire apparatus 50 may be held at an angle in relation to the strap 18. The apparatus 50 may be pushed 120 (at an angle) over the strap 18 so that the strap 18 may exist within a portion of the first interior space 12. The apparatus 50 may continue to be pushed until the maximum amount of the first interior space 12 is taken up by the strap 18. The apparatus 50 may be taken off in the opposite fashion.

It is noted that when the apparatus 50 or system 60 is in use with a securing strap 18 to secure a load, the apparatus 50 or system 60 may be subject to air pressure when the apparatus 50 or system 60, securing strap 18, and the load are in motion/transport. Due to the air pressure, the apparatus 50 or system 60 may subsequently apply more pressure to the securing strap 18 via the protrusions 10. In embodiments, apparatus 50 or system 60 may include a plurality of spaced protrusions 10 oriented and positioned for cooperation therebetween to retain the apparatus 50 or system 60 in a fixed position on securing strap 18 during use and under forces created by airflow.

It is further noted that the non-open side of the apparatus 50 may be thicker in width than the open side of the apparatus 50. This may allow for air passing around the apparatus 50 to speed up, which may keep the apparatus 50 from rattling in the wind.

Figure 8:
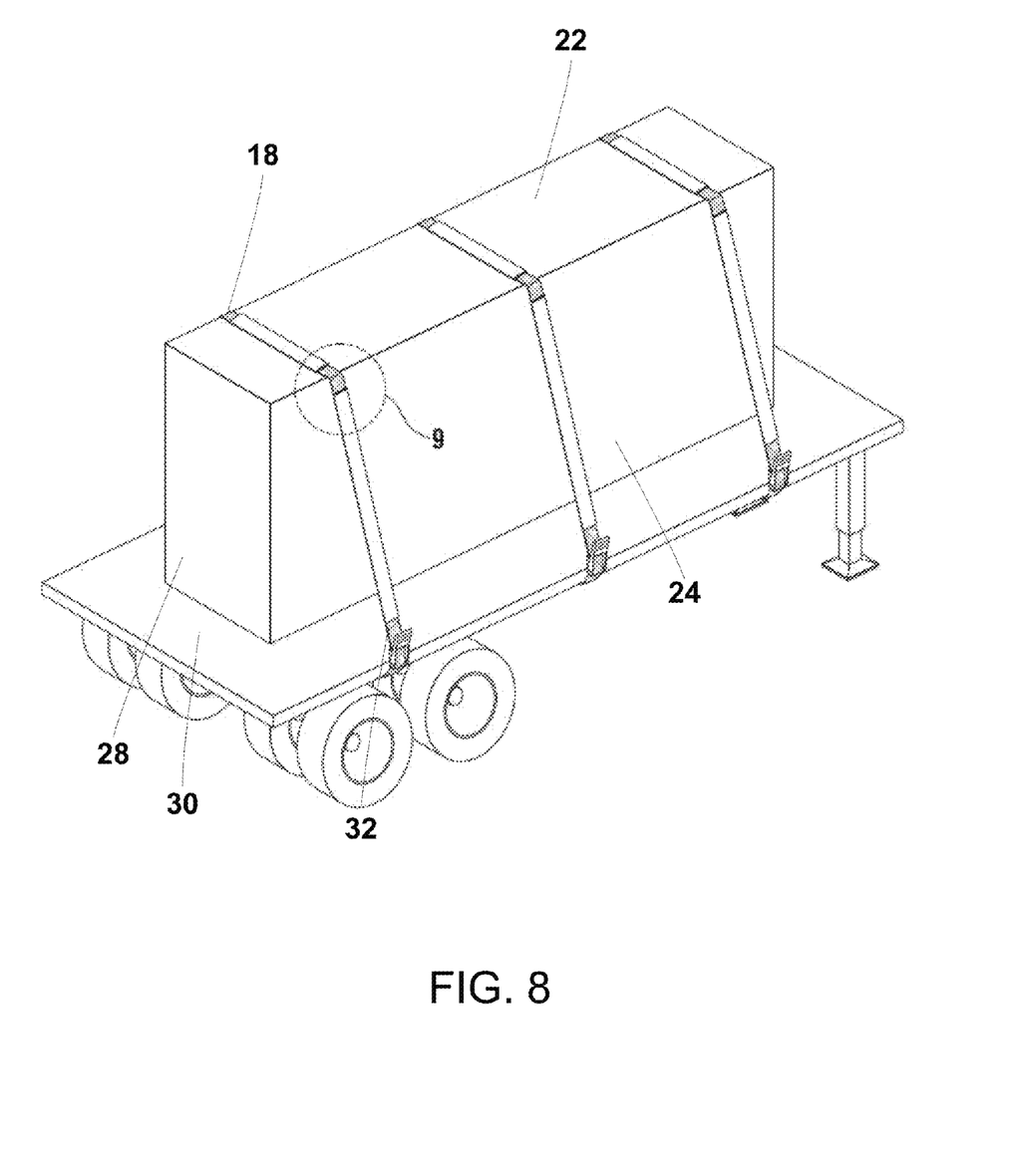
FIG. 8 displays an exemplary in situ embodiment of several strap retaining apparatuses, each installed on a strap.

FIG. 8 displays an exemplary use of a strap retaining system 60 in accordance with embodiments. In embodiments, the system 60 may include a clip portion 2. The clip portion 2 may include interior and exterior surfaces, as well as at least one protrusion, as described above with respect to FIG. 3 and FIG. 4. The system 60 may further include a clip portion 2 with a securing strap configured to fit within a first interior space 12. The system 60 may further include protrusions 10 that provide extra contact and surface area to a strap 18 so that more friction may be applied to said strap 18 as described above.

The system in the illustrated embodiment of FIG. 8 includes six strap retaining systems 60, and more specifically clip portions 2, that have been slid over a portion of angled securing straps 18. The securing straps 18 can be used, for example, to secure a load 28 by securing the strap retaining system 60 over the top of the load 22 and across the sides of the load 24. When in use, the non-open side of the apparatus 50 may face the front end of the truck to which the securing straps 18 are attached. The apparatuses 50 may decrease the amount of drag felt by the truck due to what would normally be wind disrupting the securing straps 18.

Figure 9:
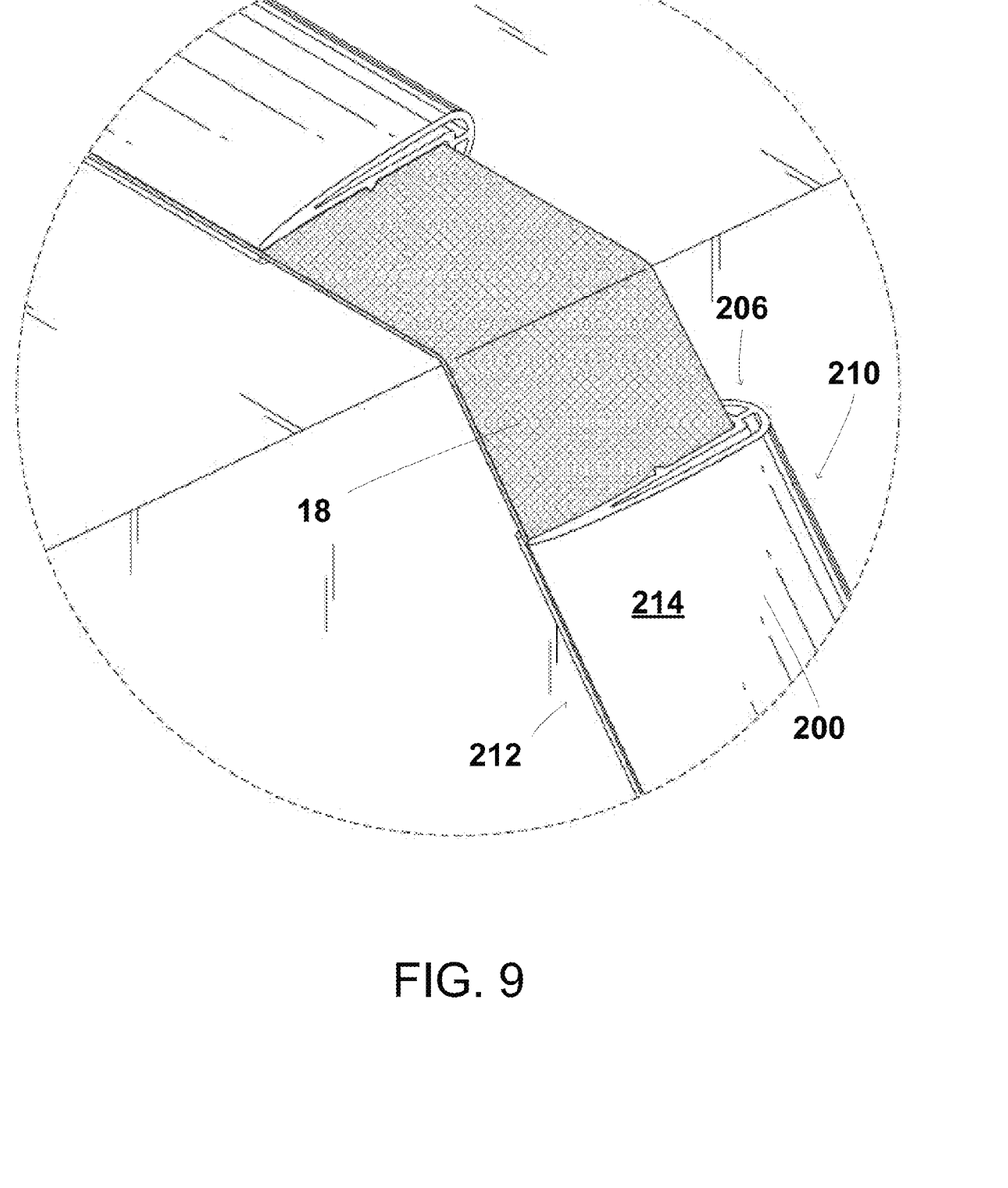
FIG. 9 displays a partial magnified view of one of an air deflection apparatus in an embodiment.

FIG. 9 displays a partial magnified view of one of an air deflection apparatus in an embodiment as seen in FIG. 8. The securing strap 18 is fixed to the trailer 30 at fixation point 32. In some embodiments there may be more than one fixation point 32 on the trailer 30 such that multiple securing straps 18, and thus multiple strap retaining systems 60/apparatuses 50, may be fixed to the trailer 30. As a result, some embodiments may include multiple strap retaining systems 60 in use on a single trailer 30.

Figure 10:
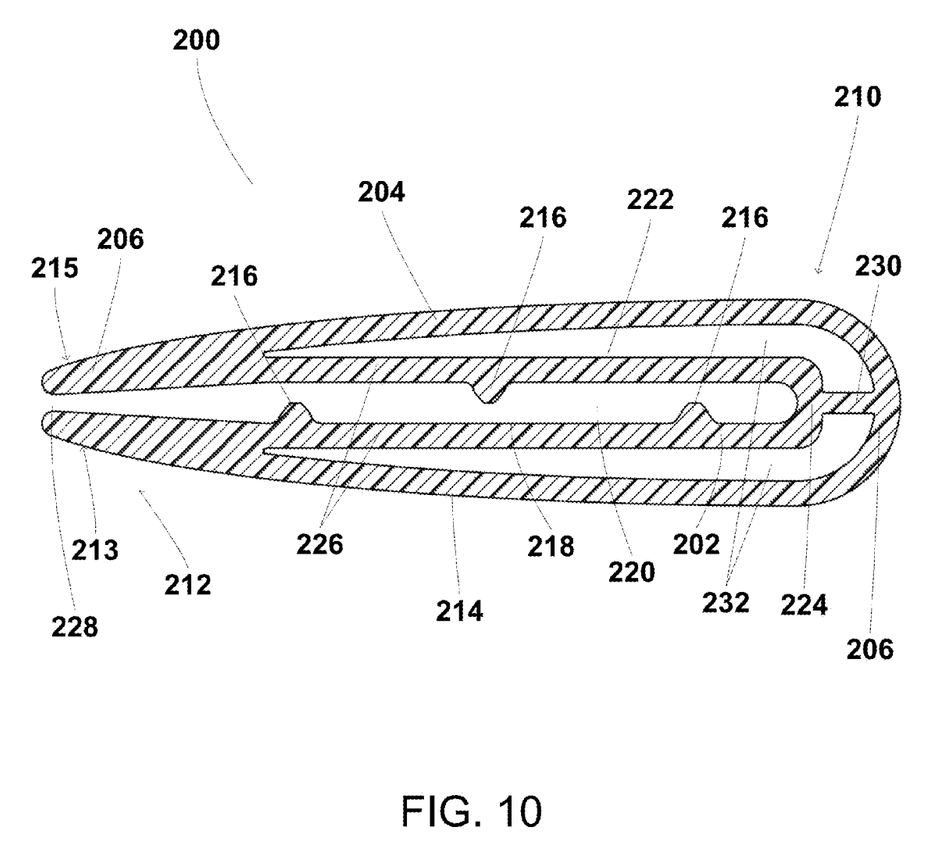
FIG. 10 displays a cross-sectional view of an air deflection apparatus in an embodiment shown generally in FIG. 9.

FIG. 9 and FIG. 10 display an air deflection apparatus 200 in an embodiment. In the embodiment shown in FIG. 10, the air deflection apparatus 200 may be identical to the strap retaining apparatus 50 shown in FIG. 1, except as otherwise described or illustrated. The air deflection apparatus 200 may be configured to deflect airflow around a segment of a strap 18 when the strap 18 is tensioned to secure a load 28 on a movable transport in forward travel of the movable transport. The air deflection apparatus 200 may comprise a clip portion 202 configured for releasable securing engagement with the strap 18. The clip portion 202 may be configured to support an airfoil portion 204 in relation to the strap 18 when the clip portion 202 is installed on the strap 18.

Referring to FIG. 10, the airfoil portion 204 may be supported by the clip portion 202. In embodiments, the airfoil portion 204 may have a pair of opposite airfoil ends 206 (shown in FIG. 9) and an elongated leading edge portion 210 extending between the opposite airfoil ends 206. The leading edge portion 210 may have a curved surface for directing airflow around the segment of the strap 18. The leading edge portion 210 may extend along the segment of the strap 18 when the clip portion 202 is installed on the strap 18. The leading edge portion 210 may be forward of the segment of the strap 18 relative to a nominal direction of forward travel of the movable transport. The airfoil portion 204 may have a trailing edge portion 212 spaced from the leading edge portion 210. The airfoil portion 204 may taper from the leading edge portion 210 to the trailing edge portion 212. The leading edge portion 210 may be located forward of the segment of the strap 18 relative to a direction of forward travel of the movable transport when the clip portion 202 is installed on the strap 18.

Referring to FIG. 10, in embodiments, the air deflection apparatus 200 may further comprise a major outer surface 214. In embodiments, the major outer surface 214 may comprise the trailing edge portion 212 and leading edge portion 210.

Referring to FIG. 10, in embodiments, the trailing edge portion 212 may further comprise a first trailing edge portion 213. In embodiments, the trailing edge portion may comprise a second trailing edge portion 215.

In embodiments, the airfoil portion 204 may comprise a major outer surface 214. In embodiments, the major outer surface 214 may comprise the first trailing edge portion 213. In embodiments, the major outer surface 214 may comprise the second trailing edge portion 215. In embodiments, the major outer surface 214 may comprise the leading edge portion 210 intermediate the first trailing edge portion 213 and the second trailing edge portion 215.

Referring to FIG. 10, in embodiments, the major outer surface 214 may define a continuous outer surface extending from the first trailing edge portion 213 to the second trailing edge portion 215. The continuous outer surface may define the leading edge portion 210 intermediate the first trailing edge portion 213 and the second trailing edge portion 215.

In embodiments, the clip portion 202 may define a recess 220 inside the airfoil portion 204 for receiving at least part of the segment of the strap 18.

Referring to FIG. 10, in embodiments, the clip portion may define a plurality of protrusions 216 disposed in the recess 220 for securing engagement with at least part of the segment of the strap 18.

FIGS. 9 and 10 depict an embodiment of an air deflection apparatus 200 configured to deflect airflow around a portion of an elongated securing strap 18 when the strap 18 is tensioned to secure a load 28 on a movable transport (see FIG. 8). The air deflection apparatus 200 may comprise a clip portion 202 configured for engagement with the strap 18 for securing the load 28 (shown in FIG. 10). The clip portion 202 may include an interior surface 218 including at least one protrusion 216 in engagement with the securing strap 18. The air deflection apparatus 200 may further comprise an airfoil portion 204 supported by the clip portion 202. In embodiments, the airfoil portion 204 may be symmetrical about a central plane. In embodiments, the clip portion 202 may comprise a first interior space 220 or recess 220 adjacent the interior surface 218.

In embodiments, the clip portion 202 may further comprise an exterior surface 222, a first end 224, and two extension portions 226.

In embodiments, the airfoil portion 204 may seamlessly engage the two extension portions 226. The airfoil portion 204 may fully encompass the clip portion 202. The airfoil portion 204 may taper to an open end 228 defined between the first trailing edge portion 213 and the second trailing edge portion 215.

In embodiments, apparatus 200 may further comprise a connecting wall 230 affixed to the first end 224 and the airfoil portion 204. The connecting wall 230 may provide rigidity to the clip portion 202 when engaging the strap 18.

Referring to FIG. 10, in embodiments, the open end 228 may be closer in distance to the seamlessly engaged two extension portions 226 than to the connecting wall 230.

In embodiments, the airfoil portion 204 may comprise at least one second interior space 232.

In embodiments, the at least one second interior space 232 may be adjacent to the exterior surface 222 and the airfoil portion 204.

In embodiments, the at least one protrusion 216 may be slanted at a 45-degree angle away from open end 228.

For the purposes of this disclosure, the term "load" may refer to an item securable by a securing strap 18, which may include, but is not limited to, a tarp, shipping container, etc.

The invention claimed is:
1. An air deflection apparatus configured to deflect airflow around a segment of a strap when the strap is tensioned to secure a load on a movable transport in forward travel of the movable transport, said air deflection apparatus comprising:
an airfoil portion having a pair of opposite airfoil ends, the airfoil portion having a leading edge portion extending between the opposite airfoil ends, the leading edge portion having a curved surface for directing airflow around the segment of the strap, the leading edge portion extending along the segment of the strap when a clip portion is installed on the strap, the leading edge portion located forward of the segment of the strap relative to a direction of forward travel of the movable transport, the airfoil portion having a trailing edge portion spaced from the leading edge portion, the airfoil portion tapering from the leading edge portion to the trailing edge portion, the leading edge portion located forward of the segment of the strap relative to the direction of forward travel of the movable transport when the clip portion is installed on the strap:
the clip portion, interior to the airfoil portion, the clip portion defining an interior space, the clip portion securely engaging the strap within the interior space, the clip portion configured to support an airfoil portion in relation to the strap when the clip portion is installed on the strap.

2. An air deflection apparatus according to claim 1, the airfoil portion comprising a major outer surface, the major outer surface comprising the trailing edge portion and leading edge portion.

3. An air deflection apparatus according to claim 2, further comprising:
the trailing edge portion comprising a first trailing edge portion and a second trailing edge portion
the leading edge portion intermediate the first trailing edge portion and the second trailing edge portion.

4. An air deflection apparatus according to claim 1, the air deflection apparatus further comprising:
the trailing edge portion comprising a first trailing edge portion and a second trailing edge portion;
the airfoil portion comprising a major outer surface, the major outer surface defining a continuous outer surface extending from the first trailing edge portion to the second trailing edge portion, the continuous outer surface defining the leading edge portion intermediate the first trailing edge portion and the second trailing edge portion.

5. An air deflection apparatus according to claim 1 and further comprising:
the clip portion defining a plurality of protrusions disposed in the major recess for securing engagement with at least part of the segment of the strap.

6. The apparatus of claim 5, the airfoil portion being symmetrical.

7. The apparatus of claim 5, the clip portion comprising a first interior space adjacent the interior surface.

8. The apparatus of claim 5, the clip portion further comprising an exterior surface, a first end, and two extension portions.

9. The apparatus of claim 8, the airfoil portion seamlessly engaging the two extension portions, the airfoil portion fully encompassing the clip portion.

10. The apparatus of claim 8, further comprising a connecting wall affixed to the first end and the airfoil portion, the connecting wall providing rigidity to the clip portion.

11. The apparatus of claim 10, further comprising an open end, the open end being closer in distance to the two extension portions than to the connecting wall.

12. The apparatus of claim 5, the airfoil portion comprising at least one second interior space.

13. The apparatus of claim 12, the at least one second interior space adjacent to the exterior surface.

14. The system of claim 5, the at least one protrusion being slanted at a 45-degree angle.

* * * * *